United States Patent [19]
Addeo

[11] Patent Number: 6,083,544
[45] Date of Patent: Jul. 4, 2000

[54] PROCESS FOR THE USE OF PULSED ELECTRIC FIELDS COUPLED WITH ROTATIONAL RETORTING IN PROCESSING MEALS READY TO EAT (MRE)

[75] Inventor: Karen M. Addeo, 45 Glen Ridge Dr., Long Valley, N.J. 07853

[73] Assignee: Karen M. Addeo, Long Valley, N.J.

[21] Appl. No.: 09/100,365

[22] Filed: Jun. 19, 1998

Related U.S. Application Data

[60] Provisional application No. 60/054,104, Jul. 29, 1997.

[51] Int. Cl.$^7$ ........................... B65B 55/12; B65B 55/02; B65B 25/22; A23L 3/32
[52] U.S. Cl. ........................... 426/234; 426/238; 426/412
[58] Field of Search ........................... 426/244, 234, 426/238, 412, 407; 99/451

[56] References Cited

U.S. PATENT DOCUMENTS

| | | | |
|---|---|---|---|
| 3,876,373 | 4/1975 | Glyptis | 426/238 |
| 4,695,472 | 9/1987 | Dunn et al. | 426/238 |
| 4,838,154 | 6/1989 | Dunn et al. | . |
| 5,048,404 | 9/1991 | Bushnell et al. | . |
| 5,283,033 | 2/1994 | Dodrill | . |
| 5,355,869 | 10/1994 | Picakard et al. | . |
| 5,415,882 | 5/1995 | Knipper et al. | . |
| 5,549,041 | 8/1996 | Zhang et al. | . |
| 5,636,317 | 6/1997 | Reznik | . |

OTHER PUBLICATIONS

Combat Ration Advanced Manufacturing Technology Demonstration (CRAMTD), N.J. Commission on Science and Technology Center; Sep. 1996; pp. 1–6 and appendix.

Combination Advanced Manufacturing Technology Demonstration (CRAMTD) No Date.

Study Of Aroma Compounds—Polysaccharides Interactions by Dynamic Exponential Dilution, Sylvie Langourieux and Jean Crouzet, Academic Press Limited, pp. 544–538 No Date.

Inactivation of *E. Coli* and *S. Cerevisiae* by Pulsed Electric Fields Under Controlled Temperature Conditions, American Society of Argicultural Engineers, Zhang et al. pp. 581–587 No Date.

Pulsed Electric Filed Treatment Chamber Design for Liquid Food Pasteurization Using A Finite Element Method, American Society of Agricultural Engineers, pp. 557–565 No Date.

Sterilization Process Critical Processing Parameters, Rotation Speed, Rack Design, Towska, H.B. Bruins and J.L. Rossen, pp. 1–9 No Date.

PQC Program for Self–Stable Products, Center for Advanced Food Technology, Jun. 1994, pp. i–12.2.

National Food Processors Association, Center for Advanced Food Technology, Beef Stew, Dec. 1993, May 1993.

Inactivation of *Saccharomyces Cerevisiae* in Apple Juice by Square–Wave and Exponential–Decay Pulsed Electric Fields, Journal of Food Processing and Preservation. Zhang, et al, (1994), pp. 469–478.

Inactivation *E. Coli* For Food Pasteurization by High-–Strength Pulsed Electric Fields, Q. Zhang, et al., Journal of Food Processing and Preservation, (1995), pp. 103–118.

(List continued on next page.)

*Primary Examiner*—Steven Weinstein
*Attorney, Agent, or Firm*—Proskauer Rose LLP

[57] ABSTRACT

An improvement to existing meals-ready-to-eat (MRE) rotational retort processes reduces the time that the food is exposed to heat. This is achieved by adding a pulsed electric field process (PEF) to the MRE process to aid in inactivating microorganisms in the food. The food may then be exposed to heat only long enough to obtain the desired sensory characteristics. Because the PEF inactivates the microorganisms in the food, the food does not have to be exposed to high temperatures for a prolonged time. As a result, the food is sterilized without losing the desired sensory characteristics or nutritional value. Moreover, the process may easily be incorporated into existing MRE production processes.

4 Claims, 6 Drawing Sheets

OTHER PUBLICATIONS

Food Pasteurization Using High–Intensity Pulsed Electric Fields, Bai–Lin Qin et al., Inst. of Food Tech, Dec. 1995, V. 49, pp. 55–60.

Inactivation of *Escherichia–Coli* for Food Pasteurization By High–Strength Pulsed Electric–Fields, Z. Qh, et al., Journal of Food Processing and Preservation, vol. 19, No. 2, Apr. 1995, abstract.

Application of Pulsed Electric Fields for Inactivation of Bacteria and Enzymes, Bai–Lin Qin, Journal of the Franklin Institute, vol. 332A, pp. 209–220, 1995.

Plasmin Inactivation with Pulsed Electric Fields, H. Mercado, et al., J. Food. Sci., vol. 60(5): 1143–1145; 1995.

Inactivation of *Escherichia coli* by combining pH, ionic strength and pulsed electric filed hurdles, H. Mercado, Food Research International, vol. 29, No. 2, p. 117–121, 1996.

New energy–efficient process could replace pasteurization, Newsfile, External Communications, University of Guelph, Mar. 1996.

Self–Heating rations: a new concept for military feeding, Food Engineering, Jan. 1994.

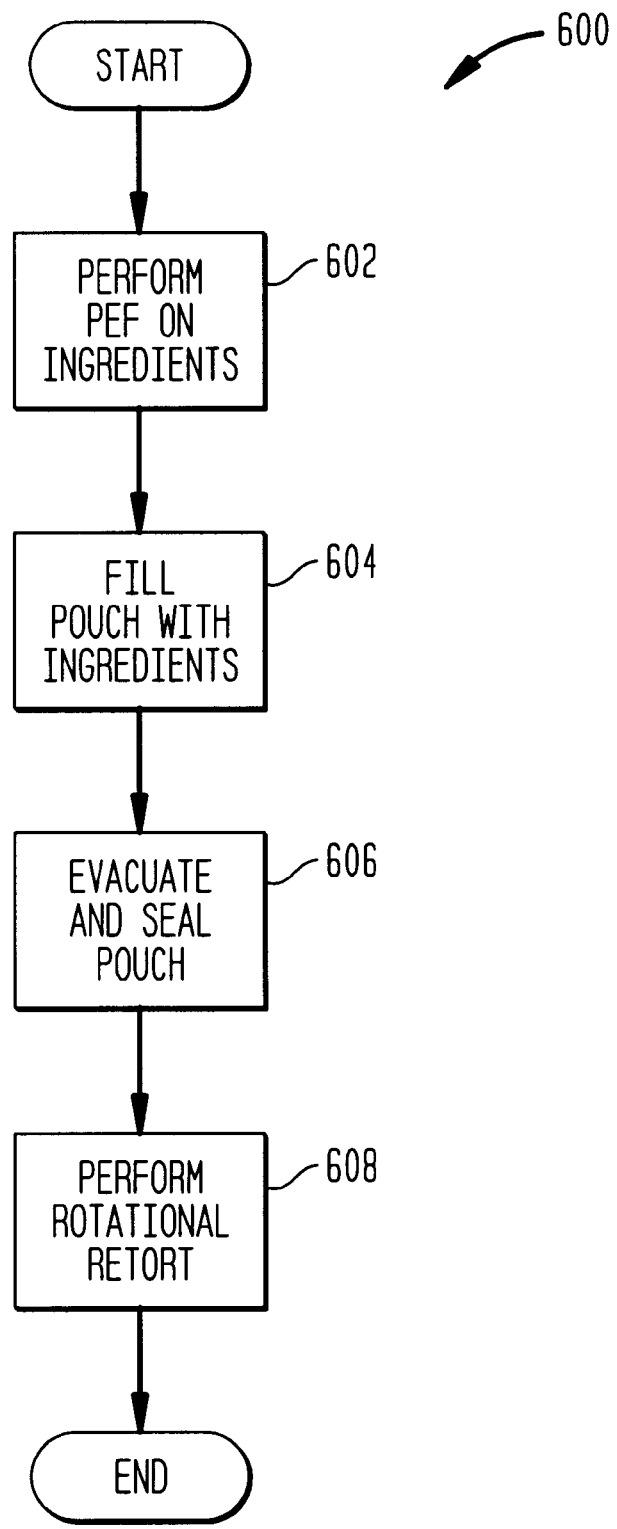

PROCESS FOR THE USE OF PULSED ELECTRIC FIELDS COUPLED WITH ROTATIONAL RETORTING IN PROCESSING MEALS READY TO EAT (MRE)

RELATED APPLICATIONS

This application claims the benefit of U.S. Provisional Application Ser. No. 60/054,104 filed on Jul. 29, 1997 entitled "Process for the Use of Pulsed Electric Fields Coupled with Rotational Retorting in Processing Meals Ready to Eat (MRE)" to Karen Addeo. The contents of this provisional application are incorporated herein by reference.

BACKGROUND OF THE INVENTION

1. Field of the Invention

The present invention relates to food processing and, more particularly, to a process for preparing meals ready to eat using both pulsed electric fields and rotational retorting.

2. Description of Related Art

Ready-to-eat meals are gaining in popularity. In addition to "microwavable" meals for conventional home use, such meals have long been used by the military for feeding troops in the field. The military refer to these ready-to-eat meals as Meals-Ready-to-Eat or MREs. MREs and other ready-to-eat meals typically are processed in a manner which provides them with a long shelf life without refrigeration. This makes the meal very convenient, particularly for military applications. MREs and other ready-to-eat meals (hereinafter collectively referred to as MREs) are contained in "retort pouches" or other containers. These containers are filled with food and then processed to kill any microorganisms, such as bacteria and the like, and enzymes which cause the food to spoil. Currently, microorganisms and enzymes are killed using a retort sterilization process.

Briefly, a retort sterilization process involves heating the food to a high temperature for a long period of time. For example, beef stew may be retort sterilized at a temperature between 248° F. and 252° F. for a time between 24 minutes to 20 minutes, respectively. A discussion of the retort sterilization process is provided in U.S. Pat. No. 5,283,033 to Dodrill. The contents of this reference are incorporated herein by reference. In addition to the sterilization, the retort process also "cooks" the food so that it obtains the desired sensory characteristics (taste, texture, appearance, etc.) so that the food may be eaten directly from the pouch either cold or heated. The desired sensory attributes may be achieved at a high heat in only a short time. The sterilization process, however, involves applying the high temperature for a long period of time, as described above. As a result of this prolonged exposure to high heat, the retort sterilization process has several drawbacks: (1) the sensory aspects of the food are adversely affected; and (2) the nutritional value of the food is adversely affected. In effect, the food is overcooked.

Regarding the sensory aspects of the food, studies performed by the Center For Advanced Food Technologies (CAFT) found that retort sterilization reduced the firmness, springiness, and denseness and increased the flakiness of beef cubes in gravy. Note that beef stew is a common entree for troops' MREs. FIGS. 1A–1D are graphs illustrating some of these findings.

Regarding the nutritional aspects of the food, retort sterilization has been found to adversely affect certain thermally sensitive nutrients. For example, the CAFT found that retort sterilization greatly decreases the ability of carrots (an important ingredient of beef stew) to retain alpha and beta carotene, important antioxidants. FIG. 2 is a graph illustrating these findings.

Rotational retort sterilization has been found to provide advantages over conventional retort sterilization. "Rotation" refers to the agitation of the food within the container at a particular rate. The (Combat Rations Advanced Manufacturing Technology Demonstration (CRAMTD, now known as Food Manufacturing Technology) found that rotational retorting provides the following advantages:

1. It increases the heat transfer rate and thus reduces the length of the retort process, improves the sensory quality of food, and retention of nutrients;
2. End-over-end agitations are superior to other types of agitation; and
3. Application of agitation should take into consideration the particular food and product container.

Thus, even with the improvements provided by rotational retort processing the current retort sterilization process does not provide a satisfactory food product. Rather, retort sterilized foods tend to have poor sensory appeal, including taste and texture, and reduced nutritional value. Thus, there is a need to reduce, but not eliminate, the time and temperature for providing MREs in order to obtain the desired the sensory aspects and the nutritional value of the food without "overcooking" the food.

Pulsed electric fields (PEF) have been shown to be effective in inactivating microorganisms and in denaturing enzymes harmful to foods. PEF, described in detail below, is a non-thermal process which has no adverse effects on the food being processed. PEF is the introduction to food using short blasts of high voltage electricity. The PEF process typically is performed at refrigerated temperatures or room temperature, depending on the foodstuff, rather than elevated temperatures such as in the retort sterilization process. Because the PEF process does not heat the food, the food does not obtain the desired sensory characteristics. The resultant product of the PEF process is not ready to eat.

FIG. 3 is a block diagram of a typical PEF device 300. A pulsed power supply 302 generates a voltage. The voltage is stored in a capacitor 304 which discharges the electricity very rapidly to a first electrode 306. A second electrode 308 is connected to ground. When the voltage is discharged by the capacitor 304, an electric field is generated between the electrodes 306, 308. Between the first and second electrodes is a treatment chamber 310 which contains the food being processed. The electric field inactivates the microorganisms in the food. A more detailed description of a PEF device is provided in U.S. Pat. No. 5,549,041 to Zhang, et al. The contents of this reference are incorporated herein by reference.

The elimination of microorganisms by PEF is a flnction of the electric field intensity, treatment time (i.e., the pulse duration x the number of pulses), temperature of the food, microorganism concentration. PEF has been successfully demonstrated to substantially eliminate microorganisms in "pumpable" foods such as diary products, juices, and fluid eggs. In addition, the process of using PEF on solid and semi-solid foods is described in the Zhang patent described above.

There is a need to provide a process for making MREs which both sterilizes the food for long shelf life without refrigeration and which also provides improved sensory characteristics and nutritional content.

SUMMARY OF THE INVENTION

This and other objects of the present invention are provided by the inventive process. The inventive process is an improvement to existing MRE rotational retort processes. The improvement reduces the time that the food is exposed to heat. This is achieved by adding a pulsed electric field (PEF) process to the MRE process to aid in inactivating microorganisms in the food. The food may then be exposed to heat only long enough to obtain the desired sensory characteristics. Because the PEF inactivates the microorganisms in the food, the food does not have to be exposed to high temperatures for a prolonged time. As a result, the food is sterilized without losing the desired sensory characteristics or nutritional value. Moreover, the process may easily be incorporated into existing MRE production processes. The resulting process is a ready to eat product which has better sensory characteristics and better nutritional value than previously possible. The MRE production process is shorter because the lengthy retort process is greatly reduced (on the order of many minutes) due to the PEF process, which takes on the order of minutes or seconds.

BRIEF DESCRIPTION OF THE DRAWINGS

The present invention is described with reference to the following figures:

FIG. 6 is flow chart illustrating a third preferred process according tot he present invention.

DETAILED DESCRIPTION OF PREFERRED EMBODIMENTS

The process according to the present invention is an improvement to existing MRE rotational retort processes which reduces the time that the food is exposed to heat. This is achieved by adding a pulsed electric field (PEF) process to the MRE process to aid in inactivating microorganisms in the food. The food may then be exposed to heat only long enough to obtain the desired sensory characteristics. Because the PEF inactivates the microorganisms in the food, the food does not have to be exposed to high temperatures for a prolonged time.

In prior art MRE processes, the retort process serves two functions to obtain the desired sensory characteristics and to inactivate microorganisms in order sterilize the product so that it is shelf stable. The sterilization process involves exposing the food to high temperatures for a long period of time, such as a temperature between 248° F. and 252° F. for a time between 24 minutes to 20 minutes, respectively. As a result, the sensory characteristics and nutritional value of the food is compromised. In the present invention, a pulsed electric field process is used to inactivate microorganisms in the food. This process has no affect on the sensory characteristics of the food nor on its nutritional value. Because the food is sterilized using the PEF process, the food may be exposed to heat during the retort process only long enough to achieve the desired sensory characteristics.

Moreover, the process may easily be incorporated into existing MRE production processes. The resulting process is a ready to eat product which has better sensory characteristics and better nutritional value than previously possible. The MRE production process is shorter because the lengthy retort process is greatly reduced (on the order of many minutes) due to the PEF process, which takes on the order of minutes or seconds.

Figure 1A:
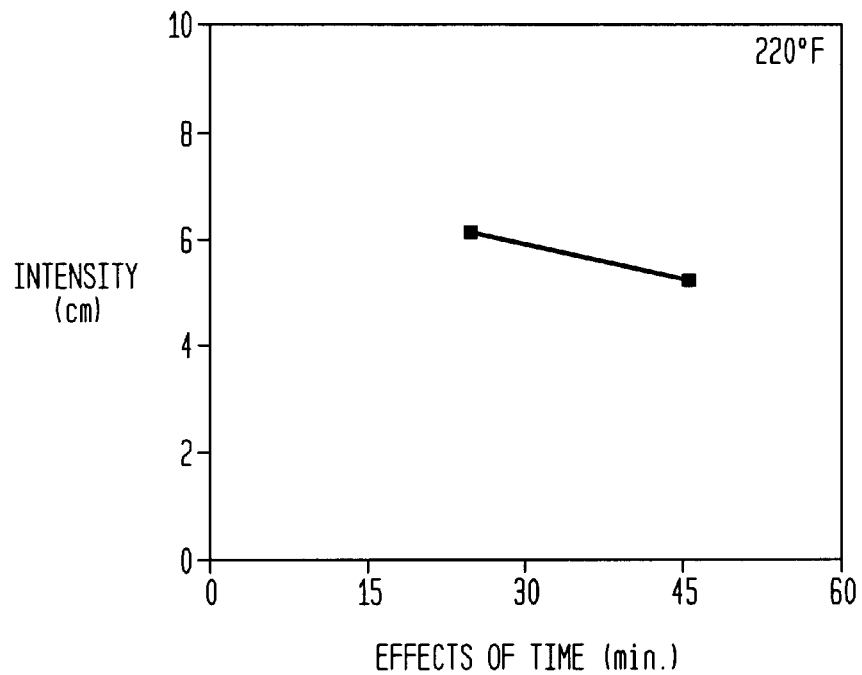
FIGS. 1A–1D are graphs illustrating the effects of prior art processes involving long exposure to high temperature on the sensory characteristics of beef cubes.
Figure 1B:
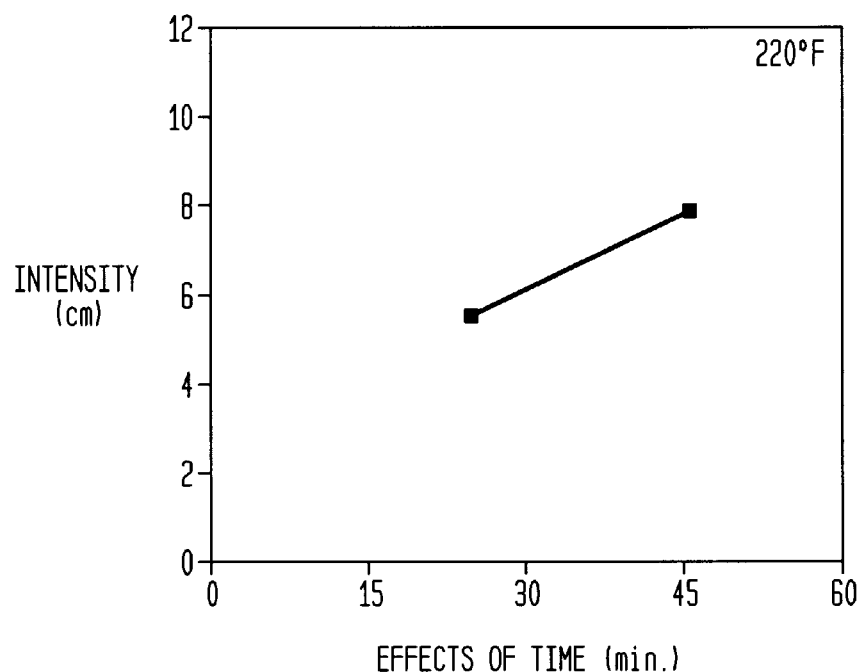
Figure 1C:
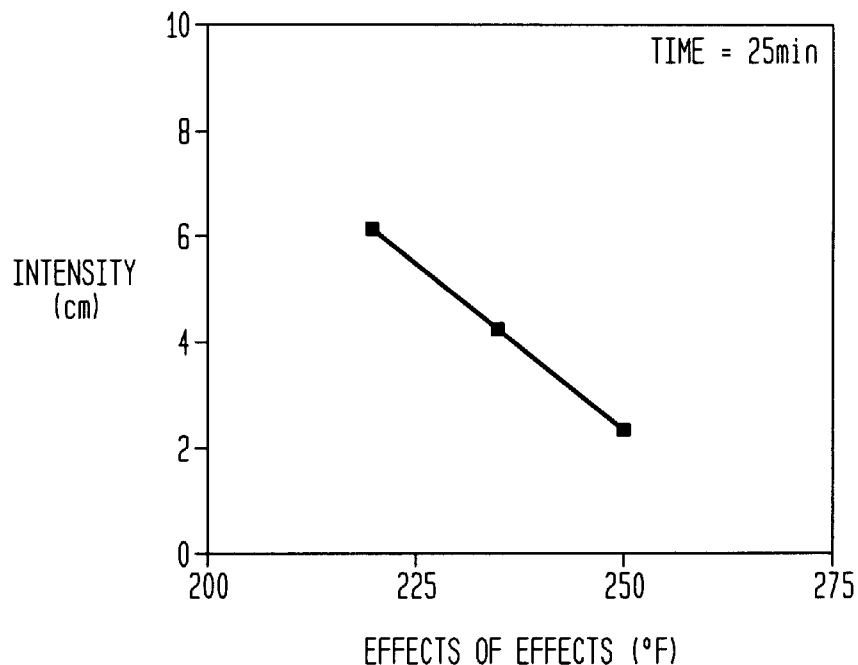
Figure 1D:
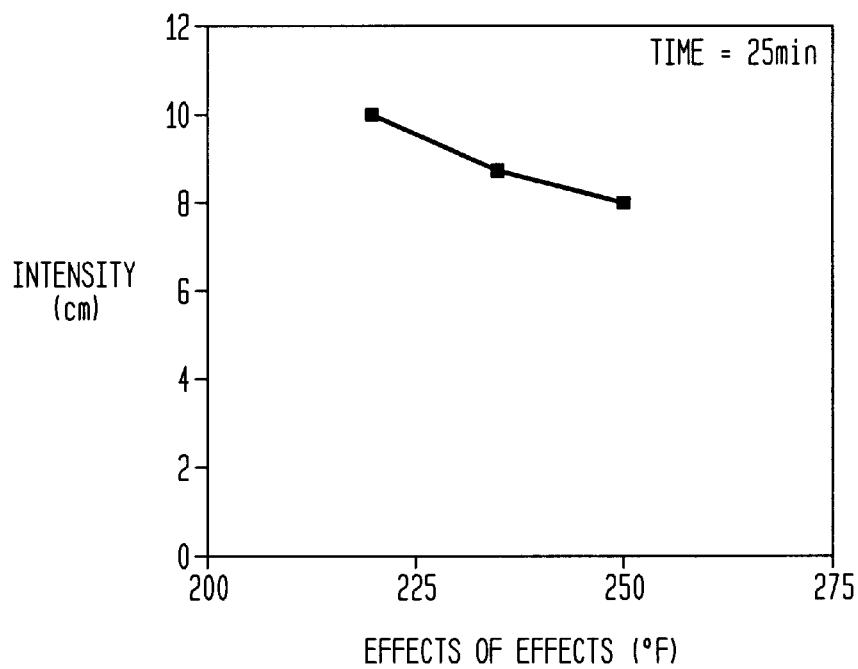
Figure 2:
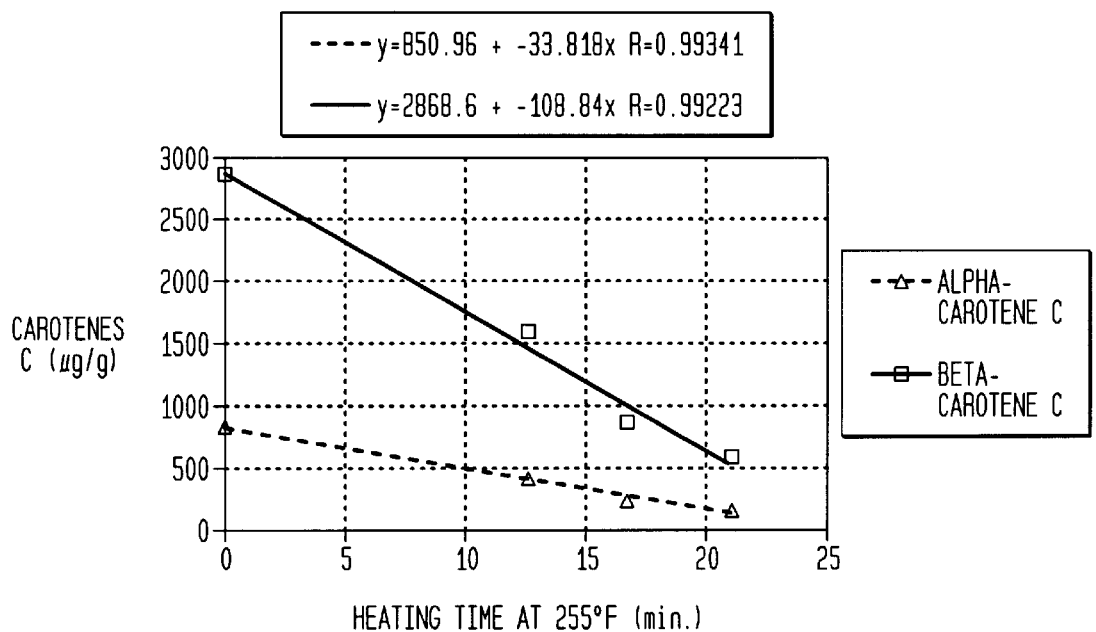
FIG. 2 is a graph illustrating the effects of prior art processes involving long exposure to high temperature on the nutrients in carrots.
Figure 3:
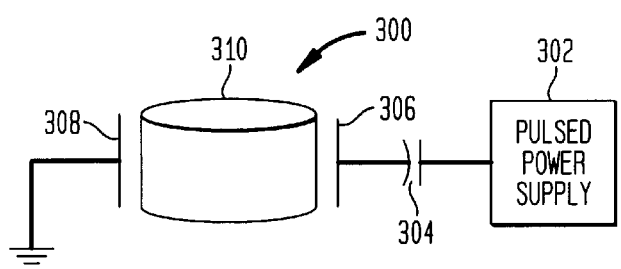
FIG. 3 is a simplified diagram of a conventional pulsed electric field device.
Figure 4:
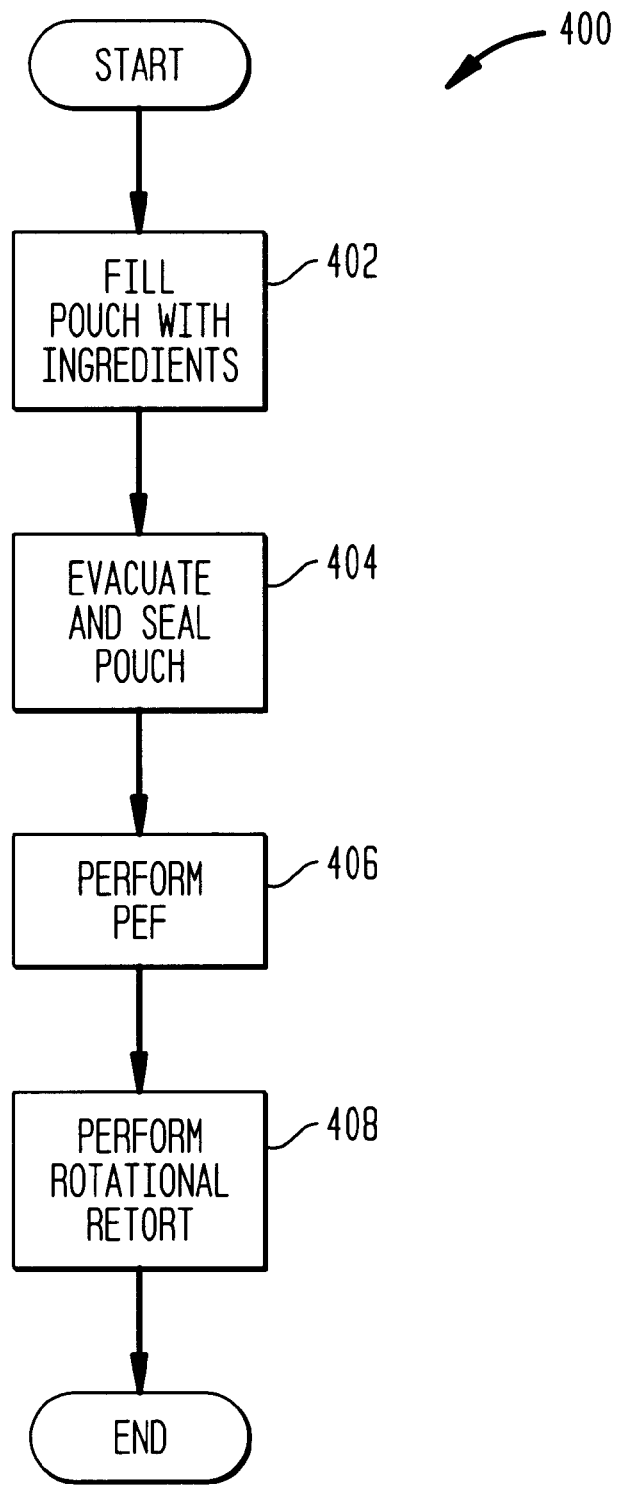
FIG. 4 is a flow chart illustrating a first preferred process according to the present invention.

FIG. 4 is a flowchart 400 illustrating a first preferred embodiment of the present invention. First, a pouch is filled with food (step 402). The food may be liquid, semi-solid, or solid food products (step 404). The pouch may then be evacuated of air or other gases and sealed (step 406) in the conventional manner. The food in the sealed pouch may be sterilized by undergo the PEF process (step 406). The PEF process may be, for example, the process disclosed in the Zhang reference discussed above. The rotational retort process is then performed (step 408). The rotational retort process may be a conventional rotational retort process well known to those skilled in the art. The process is then complete.

Figure 5:
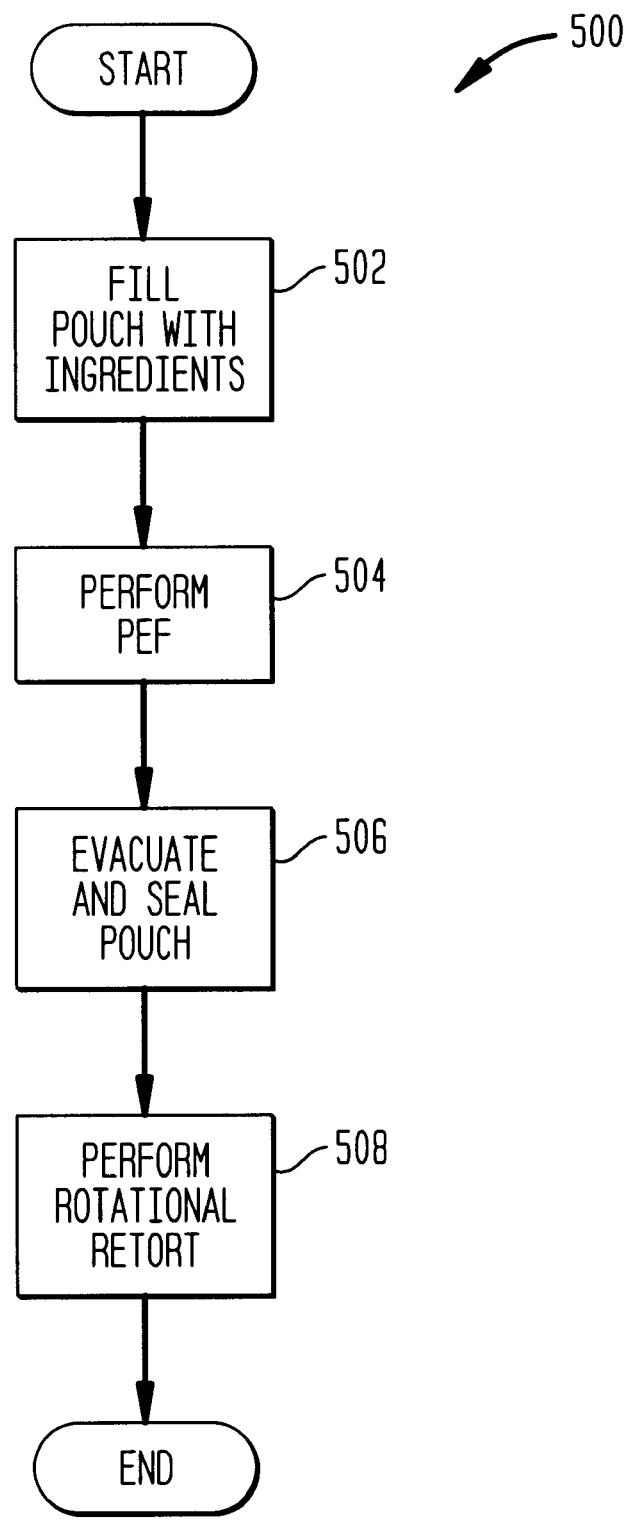
FIG. 5 is flow chart illustrating a second preferred process according to the present invention.

FIG. 5 is a flowchart 500 illustrating a second preferred embodiment of the present invention. The main difference between the processes of FIGS. 4 and 5 is that in FIG. 5, the PEF process is performed before the pouch is sealed. First, a pouch is filled with food (step 502), as discussed above. The food may be sterilized by performing a PEF process on the food in the open pouch (step 504). The pouch may then be evacuated and sealed (step 506) in the conventional manner. The sealed pouch may then undergo the rotational retort process (step 508). The process is then complete.

In the embodiments of FIGS. 4 and 5, the pouch is a made of a material which permits the generated electric field to penetrate in order to sterilize the food. An alternative process is described in connection with FIG. 6. FIG. 6 is a flowchart 600 illustrating a third preferred embodiment of the present invention. The main difference between the processes of FIGS. 6 and 4 is that in FIG. 6, the PEF process is performed before the food is placed in the pouch. First, the food is sterilized by performing a PEF process on the food (step 602). Next, a pouch is filled with the sterilized food (step 604), as discussed above. The pouch may then be evacuated and sealed (step 606) in the conventional manner. The sealed pouch may then undergo the rotational retort process (step 608). The process is then complete.

In a preferred embodiment of the invention, the PEF process may be performed in the following manner. The PEF may be performed at a 50% duty cycle for approximately three minutes. The inventor finds that twenty pulses on the order of 20–45 kV/cm each for 150–200 msecs in duration is sufficient PEF exposure. As a result of this PEF process, the rotational retort process may be a high temperature, short time process. Such a process may be, for example, 240–252° F., and preferably 252° F. for 9 to 12 minutes or less. Thus greatly reducing the time that the food is exposed to damaging high temperatures.

The above described embodiments of the invention are intended to be illustrative only. Numerous alternative embodiments may be devised by those skilled in the art without departing from the spirit and scope of the following claims.

I claim:

1. A method for making a cooked, room temperature, shelf-stable solid or semi-solid ready to eat meal, the method comprising the steps of:

providing the food that will comprise said solid or semi-solid ready to eat meal;

exposing said food to a pulsed electric field sufficient to inactivate microorganisms in said food to sterilize said food and impart room temperature shelf-stability to said food;

packaging said food in a retort pouch, either before or after the step of exposing, and treating the pulsed electric field treated sterilized packaged food to a rotational retort process to heat the food under conditions that are sufficient to produce the cooked ready to eat meal, the heating being performed without adversely affecting the sensory characteristics and so that a reduction of nutritional value of the food is minimized.

2. The method of claim 1, wherein the step of performing the retort process further comprises performing the retort process at a temperature in a range between 240° F. and 252° F. and no more than 12 minutes.

3. The method of claim 1, wherein the packaging step includes evacuating and sealing said pouch, and wherein the exposing step sterilizes said food in the sealed pouch.

4. The method of claim 1, wherein the packaging step includes evacuating and sealing said pouch, and wherein the exposing step sterilizes said food prior to said packaging step.

* * * * *